United States Patent [19]

Okumura et al.

[11] Patent Number: 4,580,073
[45] Date of Patent: Apr. 1, 1986

[54] VIBRATION WAVE MOTOR WITH PLURAL PROJECTION VIBRATOR

[75] Inventors: Ichiro Okumura, Tokyo; Kazuhiro Izukawa, Yokohama, both of Japan

[73] Assignee: Canon Kabushiki Kaisha, Tokyo, Japan

[21] Appl. No.: 599,521

[22] Filed: Apr. 12, 1984

[30] Foreign Application Priority Data

Apr. 30, 1983 [JP] Japan .................................. 58-76754

[51] Int. Cl.$^4$ ...................... H01L 41/00; F16H 27/02
[52] U.S. Cl. ..................................... 310/323; 310/328
[58] Field of Search ................. 310/322, 328, 330, 26, 310/324, 323

[56] References Cited

U.S. PATENT DOCUMENTS

| | | | |
|---|---|---|---|
| 4,019,073 | 4/1977 | Vishnevsky et al. | 310/322 |
| 4,325,264 | 4/1982 | Sashida | 310/323 |
| 4,484,099 | 11/1984 | Kawai et al. | 310/323 |
| 4,504,760 | 3/1985 | Yamamoto et al. | 310/323 |

FOREIGN PATENT DOCUMENTS

| | | | |
|---|---|---|---|
| 532947 | 11/1975 | U.S.S.R. | 310/323 |
| 197710 | 10/1977 | U.S.S.R. | 310/323 |
| 623241 | 9/1978 | U.S.S.R. | 310/328 |

Primary Examiner—Patrick Salce
Assistant Examiner—D. L. Rebsch
Attorney, Agent, or Firm—Fitzpatrick, Cella, Harper & Scinto

[57] ABSTRACT

In a vibration wave motor for driving a movable member contacting a vibration member, a travelling vibration wave is generated in the vibration member by electrostrictive elements, applying a periodic voltage to the elements. The vibration member is divided into a number of projections on at least a surface facing the movable member.

14 Claims, 9 Drawing Figures

VIBRATION WAVE MOTOR WITH PLURAL PROJECTION VIBRATOR

BACKGROUND OF THE INVENTION

1. Field of the Invention

The present invention relates to a vibration wave motor driven by a travelling vibration wave, and more particularly to a structure of a vibration member which propagates the vibration wave.

2. Description of the Prior Art

As shown in U.S. Pat. No. 4,019,073, a vibration wave motor transduces a vibration generated when a periodic voltage such as an A.C voltage or a pulsating voltage is applied to electrostrictive elements, to a rotating motion or a linear motion. Since it needs no wiring, unlike a conventional electromagnetic motor, it is simple and compact in structure, produces a high torque at a low rotating speed and has a low moment of inertia.

In the vibration wave motor shown in the U.S. Pat. No. 4,019,073, a movable member such as a rotor which contacts to a vibration member is frictionally driven in one direction by a standing vibration wave generated in the vibration member. In a forward movement of the vibration, the vibration member and the movable member frictionally contact each other, and in a backward movement, they separate from each other. Accordingly, the vibration member and the movable member must be structured to contact in small areas, that is, to present point or line contact to each other. As a result, friction drive efficiency is low.

Recently, in order to resolve the above problem, a vibration wave motor which friction-drives the movable member by a travelling vibration wave generated in the vibration member has been proposed.

FIG. 1 shows a major portion thereof. Numeral 1 denotes an electrostrictive element which may be PZT (Titanic acid zirconium lead) and numeral 2 denotes a vibration member which is supported on a stator (not shown) together with the electrostrictive element 1. Numeral 3 denotes a movable member which is press-contacted to the vibration member 2 and forms a rotor. A plurality of electrostrictive elements 1 are bonded, and the electrostrictive elements in one group are arranged at a pitch which is shifted by one quarter of a wavelength $\lambda$ of a vibration wave, relative to the electrostrictive elements of other group. In each group, the electrostrictive elements are arranged at a pitch of one half of the wavelength $\lambda$ and at opposite polarities between adjacent ones.

With the vibration wave motor of this structure, an A.C. voltage $V_0 \sin \omega T$ is applied to every other electrostrictive element in one group and an A.C. voltage $V_0 \cos \omega T$ is applied to all electrostrictive elements in the other group. As a result, the electrostrictive elements are supplied with the A.C. voltages such that the polarities are opposite between adjacent ones and the phases are shifted by 90 degrees between the groups, and the electrostrictive elements vibrate. The vibration is propagated to the vibration member 2, which is bent in accordance with the pitch of the electrostrictive elements 1. The vibration member 2 projects at every other electrostrictive element position and recesses at every other electrostrictive element position. On the other hand, since the electrostrictive elements in one group are arranged at one-quarter wavelength shifted positions relative to the electrostrictive elements in the other group, the bending vibration travels. While the A.C. voltages are applied, the vibrations are sequentially excited and propagated through the vibration member 2 as a travelling bending vibration wave.

The travel of the wave is shown in FIGS. 2(a) to 2(d). Assuming that the travelling bending vibration wave travels in a direction X, and 0 denotes a center plane of the vibration member in a stationary state, the vibration wave in a vibration state is shown by a chain line. In a neutral plane 6, bending stress is balanced. On a crossing line of the neutral plane 6 and a sectional plane 7 normal to the neutral plane 6, no stress is applied and a vertical vibration occurs. The sectional plane 7 makes pendulum vibration laterally around the crossing line 5. In FIG. 2(a), a point P on a crossing line of the sectional plane 7 and surface of the vibration member 2 facing the movable member 1 is right dead center of the lateral vibration and it makes only a vertical movement. In this pendulum vibration, a leftward (opposite to the direction of travel of the wave) stress is applied when the crossing line 5 is on a positive side of the wave (above the center plane 0), and rightward stress is applied when the crossing line 5 is on a negative side of the wave (below the center plane 0). In FIG. 2(a), a crossing line 5' and a sectional plane 7' show the former state in which a stress F' is applied to a point P', and a crossing line 5'' and a sectional plane 7'' show the latter status in which a stress F'' is applied to P''. As the wave travels and the crossing line 5 comes to the positive side of the wave as shown in FIG. 2(b), the point P makes a leftward movement and an upward movement. In FIG. 2(c), the point P is a top dead center of the vertical vibration and makes only the leftward movement. In FIG. 2(d), it makes the leftward movement and a downward movement. As the wave further travels, it returns to the state of FIG. 2(a) through rightward and downward movements and the rightward and upward movements. Through the series of movements, the point P makes a rotating elliptic motion, and the radius of rotation is a function of t/2 where t is a thickness of the vibration member 2. On the other hand, as shown in FIG. 2 (c) on a tangential line between the point P and the movable member 3, the movable member 3 is frictionally driven by the motion of the point P.

In this vibration wave motor, the velocity of the movable member 3 is determined by the velocity of the point P on the surface of the vibration member 2. In order to increase the velocity of the movable member 3, it is necessary to increase the rotating speed of the point P on the surface of the vibration member 2. The radius of the rotating vibration could be increased by increasing the thickness t of the vibration member 2, but as the thickness of the vibration member 2 increases, rigidity increases and the vibration amplitude and rotation angle of the rotating vibration are reduced. Therefore, there is a limit in the increase of the velocity of the point P on the surface of the vibration member 2.

SUMMARY OF THE INVENTION

It is an object of the present invention to provide a vibration wave motor having a high drive efficiency by dividing a vibration member into a number of pieces on a surface facing a movable member.

The other objects of the present invention will be apparent from the following description of the invention.

DETAILED DESCRIPTION OF THE PREFERRED EMBODIMENTS

One embodiment of the present invention is now explained with reference to FIG. 3.

Figure 1:
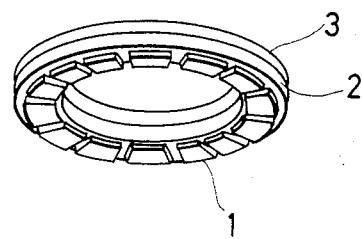
FIG. 1 is a schematic view of a major portion of a vibration wave motor.
Figure 3:
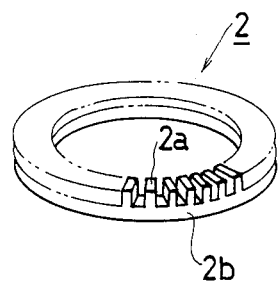
FIG. 3 is a perspective view of a vibration member of a vibration wave motor in accordance with one embodiment of the present invention.

In FIG. 3, a vibration member 2 of a vibration wave motor is of ring shape and divided into small vibration projections 2a on a surface facing a movable member 3 (not shown in FIG. 3) while it is a continuous base 2b on a surface facing electrostrictive or electro-mechanical conversion elements 1. The other structure of the vibration wave motor is the same as that shown in FIG. 1.

Figure 4:
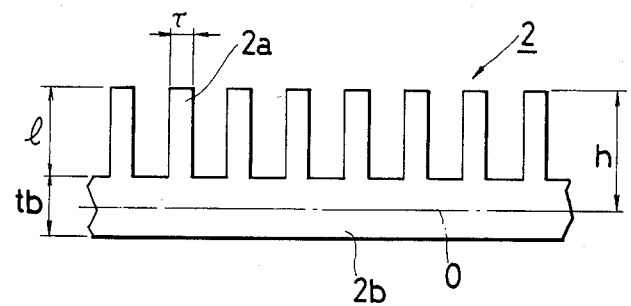
FIG. 4 is a detailed side elevational view of the embodiment of FIG. 3.
Figure 2A:
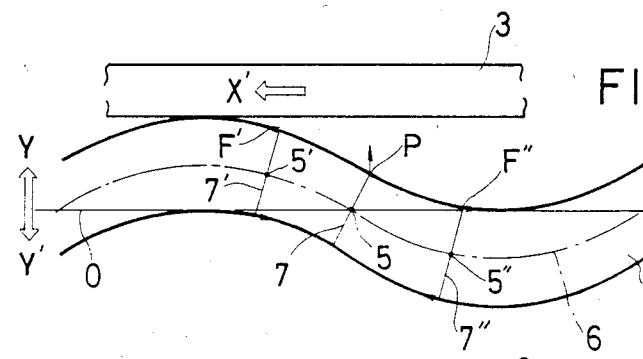
FIGS. 2 (a), (b), (c), and (d) illustrates a principle of drive of the vibration wave motor.
Figure 2B:
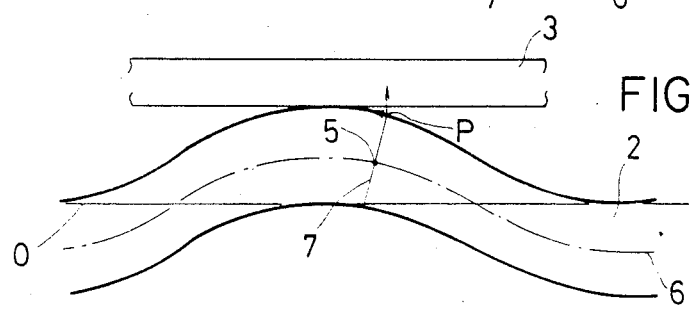
Figure 2C:
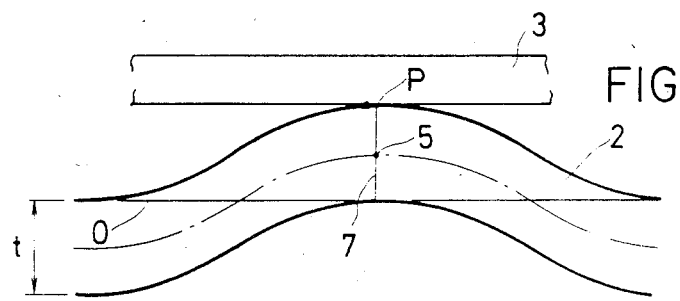
Figure 2D:
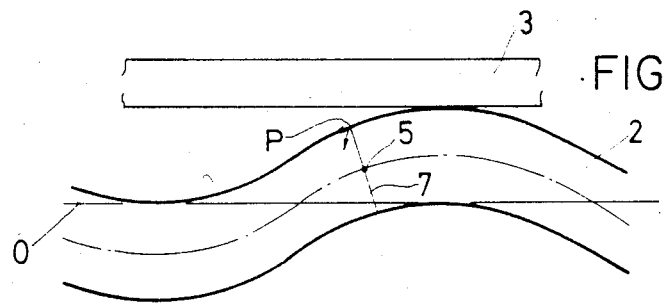

FIG. 4 shows the dimensions of the vibration member 2. 0 denotes a center plane of the base 2b, tb denotes the thickness of the base 2b, $\tau$ denotes the thickness of the small vibration projections and l denotes the length thereof. The small vibration pieces 2a have a Young's modulus E and a density $\rho$, and h denotes the distance from an end of the small vibration piece to the center plane 0.

Figure 5:
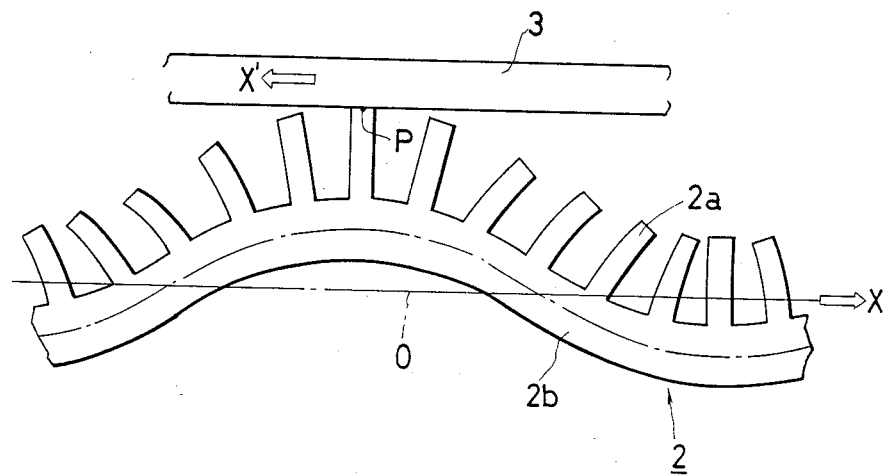
FIG. 5 illustrates drive of a movable member by the vibration member.

FIG. 5 illustrates the drive of the movable member 3 by the ends of the small vibration projections 2a of the vibration member 2 in which a bending travelling vibration wave is generated.

The bending travelling wave travels in a direction X and the movable member 3 is moved in a direction X'. A radius of rotation of a rotating elliptic motion at a point P is a function of h. It is a significant improvement over a radius of rotation of the rotating elliptic motion at the point P on the prior art vibration member 2 (see FIG. 2), which is a function of t/2. Furthermore, with this shape, the amplitude is not reduced because the rigidity of the vibration member is not substantially increased, and hence it contributes to the increase of the radius of rotation.

The velocity can be further increased if the dimensions of the small vibration projections 2a meet the following relation.

$$\tau/l^2 = (2\pi f/1.875^2)\sqrt{12\rho/E}$$

The above relation is a condition for resonance of the small vibration projections 2a excited by the vibration of the base 2b of the vibration member 2. If the above is met with a condition for resonance of a primary mode for the small vibration projections 2a which are cantilevers, the velocity of the movable member 3 is increased by an additional resonance effect of the bending vibration of the small vibration projections 2a. FIG. 5 shows the small vibration projections 2a being sequentially bent.

Since the edges of the small vibration projections 2a scratchedly drive the movable member 3, drive efficiency is improved over that of the prior art structure in which the movable member 3 is frictionally driven by the surface of the vibration member 2.

As described hereinabove, in the vibration wave motor of the present invention, the radius of rotating motion of the point P on the vibration member 2 increases, the velocity of the movable member is increased by the resonance of the small vibration projections 2a depending on the dimensions thereof, and the high friction drive efficiency is attained. Thus, a very high performance vibration wave motor is provided.

Figure 6:
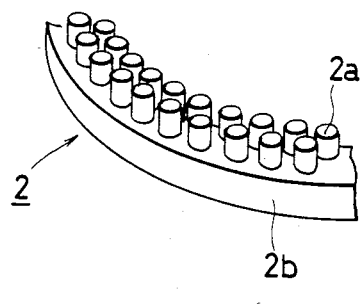
FIG. 6 is a partial perspective view of another embodiment of the vibration member.

A structure of the small vibration projections 2a is not limited to that described above but it may be a cylinder structure as shown in FIG. 6, or a square bar structure or a pin structure.

The present invention is also applicable to a linear vibration wave motor.

What we claim is:

1. A vibration wave motor comprising:
   electro-mechanical conversion elements;
   a vibration member for generating a travelling vibration wave when electrical signals having a phase difference therebetween are applied to said elements, said vibration member having one surface thereof divided into a plurality of projections; and
   a movable member adapted to be frictionally driven by the travelling vibration wave generated in said vibration member.

2. A vibration wave motor according to claim 1, wherein said projections are on a surface facing said movable member and said vibration member has a continuous area on a surface facing said electro-mechanical conversion elements.

3. A vibration wave motor according to claim 1, wherein said plurality of projections have axes which extend perpendicularly from a plane of said vibration member which is parallel with a plane defining the contacting surface of said movable member.

4. A vibration wave motor according to claim 1, wherein each of said projections has a length which is set to be vibrated with said travelling vibration wave.

5. A vibration wave motor according to claim 1, wherein each of said projections has an edge on one side for driving said movable member.

6. A vibration wave motor according to claim 1, wherein each of said projections is cylindrical in shape.

7. A vibration wave motor according to claim 1, wherein each of said projections has a square, bar-like shape.

8. A vibration wave motor comprising:
   (a) electro-mechanical energy conversion elements;
   (b) a vibration member for generating a travelling wave when an electrical signal is applied to said conversion elements, said vibration member having one surface thereof divided into a plurality of substantially perpendicular extended projections from a plane of another surface of said vibration member.

9. A motor according to claim 8, wherein each of said projections have a length which is set to resonantly vibrate with said travelling vibration wave.

10. A vibration wave motor according to claim 9, wherein said electro-mechanical energy conversion elements comprise:
    (a) a first element group connected with said vigration member, and (b) a second element group arranged with a predetermined phase difference with respect to said first element group;
   wherein electrical signals having a predetermined phase difference are respectively applied to said first and second element groups.

11. A motor according to claim 8, further comprising:
a contact member contacting with the divided surface of said vibration member for receiving the force of said travelling vibration.

12. A motor according to any one of claims 8-11, wherein each of said projections is cylindrical in shape.

13. A motor according to any one of claim 8-11, wherein each of said projections has a square, bar-like shape.

14. A vibration wave motor according to claim 1, wherein said electro-mechanical conversion elements comprise:
   (a) a first element group connected with said vibration member, and
   (b) a second element group arranged with a predetermined phase difference with respect to said first element group;
      wherein electrical signals having a predetermined phase difference are respectively applied to said first and second element groups.

* * * * *

UNITED STATES PATENT AND TRADEMARK OFFICE
CERTIFICATE OF CORRECTION

PATENT NO. : 4,580,073
DATED : April 1, 1986
INVENTOR(S) : Okumura et al.

It is certified that error appears in the above-identified patent and that said Letters Patent is hereby corrected as shown below:

Column 1, line 47, change "of other group" to --of the other group--.

Column 2, line 28, change "to $P''$." to --to a point $P''$.--.

Column 2, line 32, change "a top" to --atop--.

Column 2, line 64, change "pieces" to --projections--.

Column 3, line 31, change "pieces" to --projections--.

Column 3, line 33, change "piece" to --projection--.

Column 4, lines 67-8, change "vigration" to --vibration--.

Column 6, line 1, change "claim" to --claims--.

Signed and Sealed this

Twenty-eighth Day of October, 1986

[SEAL]

Attest:

DONALD J. QUIGG

Attesting Officer   Commissioner of Patents and Trademarks